(12) United States Patent
Wieth et al.

(10) Patent No.: US 8,632,081 B2
(45) Date of Patent: Jan. 21, 2014

(54) TRANSPORT CAR WITH ANTI-THEFT PROTECTION

(75) Inventors: Franz Wieth, Puchheim (DE); Horst Sonnendorfer, Puchheim (DE)

(73) Assignee: SYSTEC POS-Technology GmbH, Puchheim (DE)

( * ) Notice: Subject to any disclaimer, the term of this patent is extended or adjusted under 35 U.S.C. 154(b) by 2185 days.

(21) Appl. No.: 10/581,102

(22) PCT Filed: Sep. 22, 2004

(86) PCT No.: PCT/DE2004/002110
§ 371 (c)(1),
(2), (4) Date: May 31, 2006

(87) PCT Pub. No.: WO2005/028278
PCT Pub. Date: Mar. 31, 2005

(65) Prior Publication Data
US 2007/0013155 A1 Jan. 18, 2007

(30) Foreign Application Priority Data
Sep. 22, 2003 (DE) .............................. 203 14 705 U

(51) Int. Cl.
*B62B 3/00* (2006.01)
(52) U.S. Cl.
USPC ..................................................... 280/33.994

(58) Field of Classification Search
USPC ........................................ 280/33.991–33.997
See application file for complete search history.

(56) References Cited

U.S. PATENT DOCUMENTS

| | | | |
|---|---|---|---|
| 4,199,043 A | | 4/1980 | Lankester et al. |
| 4,580,800 A | * | 4/1986 | Upton et al. ............. 280/33.994 |
| 4,591,175 A | * | 5/1986 | Upton et al. ............. 280/33.994 |
| 4,772,880 A | * | 9/1988 | Goldstein et al. ......... 340/568.5 |
| 5,899,469 A | * | 5/1999 | Pinto et al. ................ 280/79.11 |
| 6,054,923 A | * | 4/2000 | Prather et al. ............. 340/568.5 |
| 6,079,719 A | * | 6/2000 | Tisbo et al. ................ 280/47.35 |
| 6,102,414 A | * | 8/2000 | Schweninger ........... 280/33.994 |
| 6,161,849 A | * | 12/2000 | Schweninger ........... 280/33.994 |
| 6,271,755 B1 | * | 8/2001 | Prather et al. ............. 340/568.5 |
| 6,502,669 B1 | * | 1/2003 | Harris ........................ 188/1.12 |
| 2004/0051263 A1 | * | 3/2004 | Prather et al. ............ 280/33.994 |

FOREIGN PATENT DOCUMENTS

| | | | | |
|---|---|---|---|---|
| GB | 2 327 916 | | 2/1999 | |
| GB | 2327916 A | * | 2/1999 | ................ B62B 3/14 |
| GB | 2 398 235 | | 8/2004 | |
| GB | 2398235 A | * | 8/2004 | ............. B60B 33/02 |

* cited by examiner

*Primary Examiner* — Katy M Ebner
(74) *Attorney, Agent, or Firm* — Volpe and Koenig, P.C.

(57) ABSTRACT

A transport car with rollers, all of which are steerable, for which an activatable anti-theft protection is provided. With the anti-theft protection, two or more of the rollers may be fixed in a predetermined steering position whereby the angle which the rollers are fixed at relative to a longitudinal axis of the transport cart is different between the two or more rollers.

4 Claims, 1 Drawing Sheet

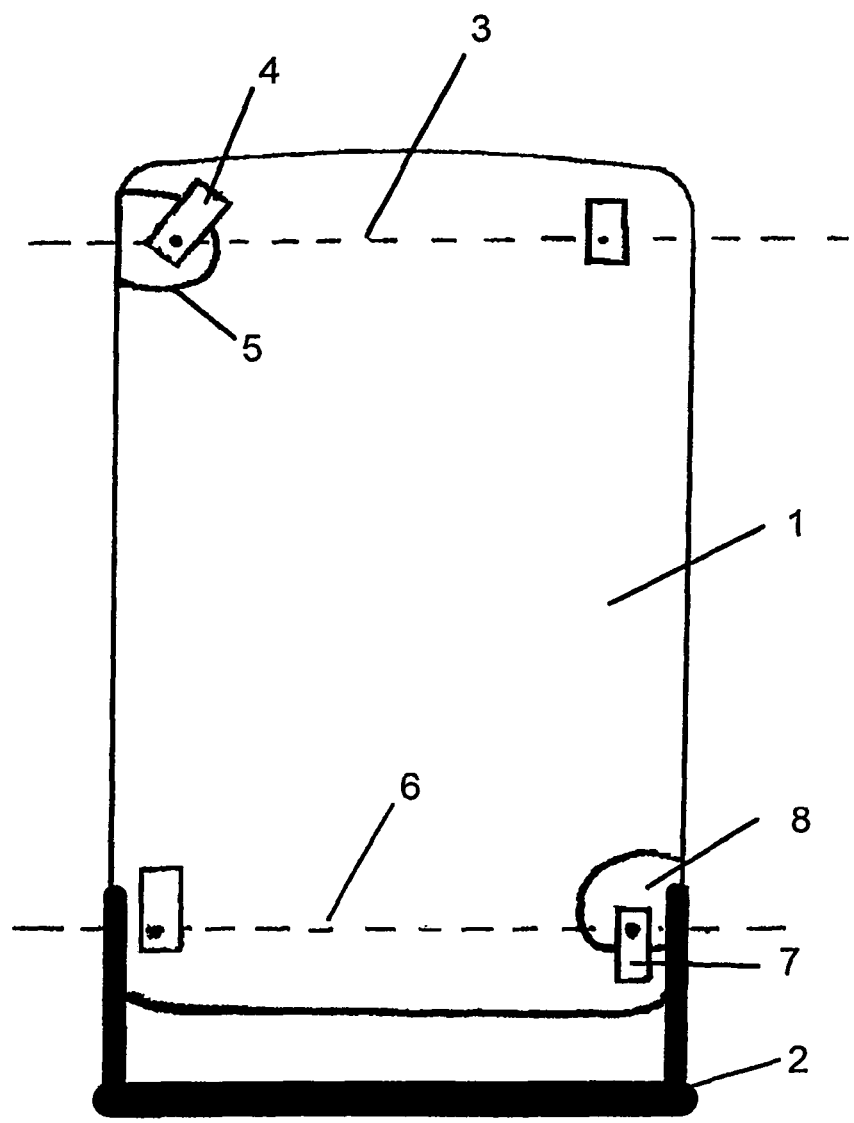

TRANSPORT CAR WITH ANTI-THEFT PROTECTION

BACKGROUND

The invention relates to a transport car with rollers, which may be steered. The rollers are mounted at two axles of the shopping cart, in order to ensure a tilt-safe movement of the shopping cart. The rollers are rotatable at the front axle around a steering axis aligned perpendicular to the direction of movement. At the rear axle, the rollers are either pivotal around a control axis similar to the rollers of the front axle or the rollers cannot be steered. The rollers of the rear axle, which cannot be steered, are know to those skilled in the art as "fixed rollers."

The transport car with rollers that can be steered at the front and rear axles are easier to maneuver. In Europe, primarily transport cars of this type are used, in the U.S.A. primarily transport cars with fixed rollers are used.

Such transport cars are provided inside the market by shopping markets for customers to transport goods, and are also provided in a corresponding parking lot, if applicable.

In order to prevent a transport car from moving outside the permitted area a number of devices are known, which prevent the pushing of the transport car or at least make it substantially more difficult.

Some of the solutions provide for blocking at least one roller. These solutions can be used equally regardless of the type of rear axle used. In this solution it is disadvantageous for the rollers because they can become severely worn at one point and subsequently no longer roll smoothly.

Another solution provides for fixing a steering axle of one wheel of the front axle in a diagonal position in order to allow only a circular movement of the shopping cart. Although this prevents the unilateral wear it is only effective in transportation rollers with fixed rollers at the rear axle, the so-called fixed rollers.

SUMMARY

The object of the invention is to provide an anti-theft protection for transport cars, which avoids the disadvantages of prior art and which provides an effective anti-theft protection without wearing the rollers, in particular for transport cars with rollers at the front and rear axles that can be steered.

This objective is attained in the characterizing features according to the claims.

The considerations that lead to the development of the present invention provide in an inventive manner that rollers at the rear axle that can be steered are transferred into a "fixed rollers" if the axle that can be steered is blocked.

Further considerations lead to the discovery that the continued movement of a transport car is always effectively impeded when the steering angle of two rollers is fixed and the steering angle of the fixed rollers is different in reference to one another. Here, it is irrelevant if the blocked rollers are located at the same axle or at different axles.

As soon as the steering angle is blocked, only a circular movement is possible. The radius of the circular movement still possible depends on the difference of the steering angles of the rollers and is smallest, if the steering angle amounts to an angle of 90 degrees in reference to one another.

The rollers remain rotary even in the activated anti-theft state, which advantageously prevents any wear of the blocked roller due to sliding.

BRIEF DESCRIPTION OF THE DRAWING

In the following, the invention is described in greater detail using an exemplary embodiment.

The FIGURE shows a schematic representation of a shopping cart 1 in a top view.

DETAILED DESCRIPTION OF THE PREFERRED EMBODIMENTS

The user pushes, pulls, or steers the transport car 1 via the handle 2. At the front axle 3, the left roller 4 is provided with a blocking device 5 according to the invention for the steering angle. The blocking device 5 is activated and blocks the steering angle at approximately 45 degrees in reference to the virtual longitudinal axis of the transport car.

The activation can occur by different measures, already known per se, for example by crossing a magnetic threshold, a radio barrier, or after having reached a predetermined maximum transport distance.

At the rear axle 6, the right roller 7 is provided with a blocking device 8. The blocking device 8 is also blocked and fixes the steering angle at 0 degrees in reference to the longitudinal axis of the transport car.

The front axle 3 and the rear axle 6 are not continuous fixed axles, rather, as shown, the rollers are individually mounted at the front and the rear side of the transport car, and can be steered.

For the object to be achieved, to hinder the movement of the transport car, it is irrelevant, in principle, which rollers are fixed. The diagonal arrangement shown has the advantage to prevent any possible advantages intended by a unilateral tilting or lifting of the transport car, because for pushing two fixed rollers must always be used.

When the anti-theft protection is activated, one embodiment of the fixing device provides that a spring-loaded bolt immediately snaps into a recess in the roller as soon as the steering angle is equivalent to the predetermined blocking angle.

It is also possible that, when the anti-theft protection is activated, to bring the roller automatically into the steering position equivalent to the blocking angle, in order to activate the blocking as quickly as possible.

This is possible, when a force is developed after the activation of the anti-theft protection, which brings the rotation of the wheel into the lateral position according to the blocking angle.

The selection made to fix the roller at the front axle in a diagonal angle and the roller at the rear axle approximately parallel to the longitudinal axis of the vehicle is advantageous in that this roller position occurs relatively frequent during the pushing of the transport car and then the fixation of the rollers can occur very quickly, after the permissible use range has been exceeded.

The rear rollers take this position during the pushing straight forward and the front rollers are in a diagonal position during any turning movement.

This way it is achieved advantageously that the complete anti-theft protection is activated as soon as the first change from turning movement to straight movement occurs.

Additionally, no turning movement is necessary for achieving the blocking in an embodiment having automatic pivoting of the frontal rollers into the blocking position.

In addition to the above-mentioned use in transport cars in shopping carts, the described invention can be used at any site where the use of steered transport cars, provided with rollers, wheel chairs, carts, or the like is to be prevented outside a permissible range. It is also possible to use the invention in such vehicles having 2 or 3 wheels/rollers. The common criterion here only requires for the steering angle to be different in reference to one another when in the blocked state.

The invention claimed is:

1. A transport cart with front and rear rollers, all of which can be steered, comprising: an anti-theft protection that can be activated automatically as soon as the transport cart is located outside of a permissible area, the anti-theft protection includes at least one of the front rollers (4) and at least one of the rear rollers (7) being fixable in predetermined steering positions corresponding to a blocking angle, and upon activation, the anti-theft protection automatically moves the rollers into the steering position corresponding to the blocking angle.

2. A transport cart according to claim 1, wherein one of the front rollers (4) is mounted at a front axle (3) and is fixable in position at a diagonal angle in reference to the longitudinal axis of the transport cart (1) and one of the rear rollers (7) is mounted at a rear axle (6) and is fixable in position at a straight steering angle in reference to the longitudinal axis of the transport cart (1).

3. A transport cart according to claim 1, wherein following activation of the anti-theft protection, a force occurs which causes one of the rollers to rotate into an oblique position of the blocking angle.

4. A transport cart according to claim 1, wherein upon activation of the anti-theft protection, a spring-loaded bolt latches immediately into a recess on the roller as soon as the steering angle corresponds to the blocking angle.

* * * * *